United States Patent
Liotta et al.

(10) Patent No.: US 9,028,206 B2
(45) Date of Patent: May 12, 2015

(54) THERMALLY ACTUATED ASSEMBLY FOR A GAS TURBINE SYSTEM AND METHOD OF CONTROLLING A COOLING AIRFLOW PATH

(75) Inventors: Gary Charles Liotta, Simpsonville, SC (US); Carlos Miguel Miranda, Greer, SC (US)

(73) Assignee: General Electric Company, Schenectady, NY (US)

( * ) Notice: Subject to any disclaimer, the term of this patent is extended or adjusted under 35 U.S.C. 154(b) by 521 days.

(21) Appl. No.: 13/494,688

(22) Filed: Jun. 12, 2012

(65) Prior Publication Data

US 2013/0330168 A1 Dec. 12, 2013

(51) Int. Cl.
*F01D 5/08* (2006.01)
*F01D 17/08* (2006.01)
*F02C 9/16* (2006.01)
*F02C 9/26* (2006.01)
*F02C 9/28* (2006.01)

(52) U.S. Cl.
CPC .............. *F01D 17/085* (2013.01); *F02C 9/16* (2013.01); *F02C 9/26* (2013.01); *F02C 9/28* (2013.01)

(58) Field of Classification Search
CPC ............ F01D 17/085; F02C 9/26; F02C 9/28; F02C 9/16
USPC ............................................. 415/47, 175, 115
See application file for complete search history.

(56) References Cited

U.S. PATENT DOCUMENTS

| | | | | |
|---|---|---|---|---|
| 5,022,817 | A * | 6/1991 | O'Halloran | 415/115 |
| 7,445,424 | B1 * | 11/2008 | Ebert et al. | 415/113 |
| 8,549,864 | B2 * | 10/2013 | Langdon et al. | 60/782 |
| 8,684,660 | B2 * | 4/2014 | Miranda et al. | 415/17 |

* cited by examiner

*Primary Examiner* — Dwayne J White
*Assistant Examiner* — Jason Fountain
(74) *Attorney, Agent, or Firm* — Cantor Colburn LLP

(57) ABSTRACT

A thermally actuated assembly for a gas turbine assembly for a gas turbine system includes a heat transfer component having a first portion and a second portion, wherein the first portion is disposed within a first cavity having a first temperature and the second portion is disposed in a second cavity having a second temperature, wherein the heat transfer component extends through a cavity wall, wherein the first temperature is greater than the second temperature. Also included is a temperature sensitive element disposed within the second cavity and in operable communication with the heat transfer component. Further included is a flow manipulating device disposed within the second cavity and configured to displace in response to a temperature change in the first cavity.

13 Claims, 3 Drawing Sheets

THERMALLY ACTUATED ASSEMBLY FOR A GAS TURBINE SYSTEM AND METHOD OF CONTROLLING A COOLING AIRFLOW PATH

BACKGROUND OF THE INVENTION

The subject matter disclosed herein relates to gas turbine systems, and more particularly to a thermally actuated assembly for controlling a cooling airflow path.

Gas turbine systems include numerous areas that are temperature sensitive based on component materials and efficiency improving schemes. Such areas are often sectioned off and may be provided with a cooling source to ensure proper temperature regulation to maintain service life and improve efficiency of the overall gas turbine system. A compressor of the gas turbine system is often the cooling source and any flow extracted from the compressor to serve a cooling function detracts from the amount of flow that is delivered from the compressor to a turbine for work that is converted into energy. Such detractions are considered chargeable flow losses and reduction of these losses is desirable.

An example of a temperature sensitive area of the gas turbine system is proximate the rotor and turbine blade disks in operable connection thereto. A rim cavity is often included proximate such areas and requires a cooling flow for purging of hot gas from a hot gas path that travels at a relatively radially outward location over stator vanes and turbine blades. A seal, such as a brush seal is typically included proximate the rotor and within a path leading to the rim cavity, however, the seal gradually wears away over the service life of the gas turbine system and a greater volumetric flow rate of cooling air from the cooling source continuously enters the rim cavity during the wearing process. To accommodate the lower volumetric flow rate passing through the path earlier in the service life of the seal, a cooling flow passage is included to allow cooling flow to reach the rim cavity. As the seal wears away, an unnecessarily high amount of cooling flow reaches the rim cavity and overall gas turbine efficiency is decreased.

BRIEF DESCRIPTION OF THE INVENTION

According to one aspect of the invention, a thermally actuated assembly for a gas turbine assembly for a gas turbine system includes a heat transfer component having a first portion and a second portion, wherein the first portion is disposed within a first cavity having a first temperature and the second portion is disposed in a second cavity having a second temperature, wherein the heat transfer component extends through a cavity wall, wherein the first temperature is greater than the second temperature. Also included is a temperature sensitive element disposed within the second cavity and in operable communication with the heat transfer component. Further included is a flow manipulating device disposed within the second cavity and configured to displace in response to a temperature change in the first cavity.

According to another aspect of the invention, a thermally actuated assembly for a gas turbine system includes a first cavity having a first temperature. Also included is a second cavity having a second temperature, wherein the first temperature is greater than the second temperature, wherein the first cavity and the second cavity are separated by a cavity wall. Further included is a heat transfer component extending through the cavity wall, the heat transfer component having a first end disposed in the first cavity and a second end disposed in the second cavity. Yet further included is a temperature sensitive element disposed within the second cavity and configured to remotely detect changes in the first temperature by operably communicating with the heat transfer component. Also included is a flow manipulating device disposed within the second cavity and configured to enlarge and restrict a cooling flow passage, wherein the flow manipulating device is actuated in response to detection of a temperature change in the first cavity by the temperature sensitive element.

According to yet another aspect of the invention, a method of controlling a cooling airflow path for a gas turbine system is provided. The method includes monitoring a temperature change in a first cavity with a heat transfer component. Also included is remotely detecting the temperature change with a temperature sensitive element disposed in a second cavity, the temperature sensitive element in operable communication with the heat transfer component. Further included is actuating a flow manipulating device in response to detection of the temperature change, wherein the flow manipulating device is disposed in the second cavity.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
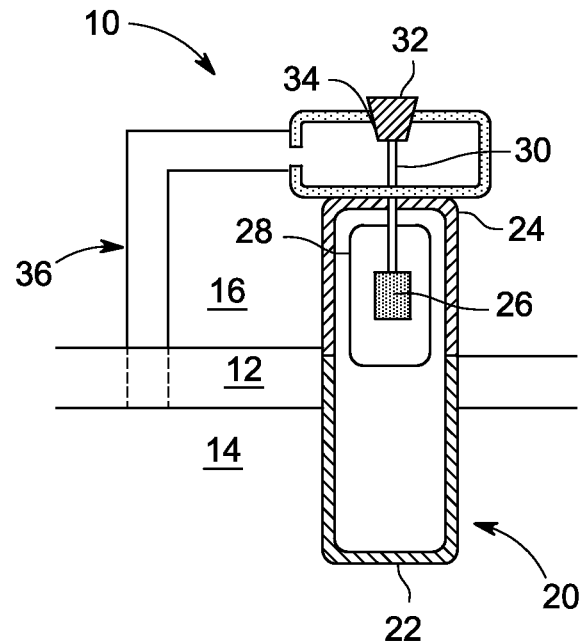
FIG. 1 is an elevational, side view of a thermally actuated assembly for a gas turbine system of a first embodiment mounted to a cavity wall, the thermally actuated assembly in a first temperature operating condition.

Referring to FIG. 1, a gas turbine system (not illustrated) comprises a thermally actuated assembly that is generally referred to with reference numeral 10. The thermally actuated assembly 10 is used in conjunction with any area of the gas turbine system that includes adjacent volumes requiring distinct operating conditions, such as temperature and pressure, for example. Specifically, a cavity wall 12 separates a first cavity 14 from a second cavity 16, where the first cavity 14 has a first temperature and a first pressure, and the second cavity 16 has a second temperature and a second pressure. In the illustrated example, the first temperature is greater than the second temperature and the second pressure is greater than the first pressure, thereby making the first cavity 14 a relatively hot cavity and the second cavity the relatively cool cavity. An example of an area of the gas turbine system where the thermally actuated assembly 10 may be disposed is proximate a turbine rotor wheel space. The turbine rotor wheel space is designed to operate at a temperature lower than that of areas subject to predominant flow of hot gas flow passing over stator vanes and turbine blades. Ingress of hot gas flow into regions such as a rim cavity, which is referred to as the first cavity 14, or hot cavity, occurs and a cooling flow 18 is supplied in response to temperature rises, as will be described in detail below. Although the aforementioned example of the turbine rotor wheel space is an exemplary location for use of the thermally actuated assembly 10, as noted above, the thermally actuated assembly 10 may be employed in numerous other contemplated areas of the gas turbine system.

In a first exemplary embodiment of the thermally actuated assembly 10, a heat transfer component 20 comprises a heat pipe that extends through the cavity wall 12 and includes a first portion 22 disposed in the first cavity 14 and a second portion 24 disposed in the second cavity 16. The heat transfer component 20 is in close proximity to and/or in operable connection with a temperature sensitive element 26 that remotely senses the temperature of the first cavity 14 indirectly via the heat transfer component 20. The temperature sensitive element 26 comprises any element that displaces in response to temperature changes and may include a thermal fluid, a bimetal component or a spring, for example. In the case of the thermal fluid, an actuator housing 28 encloses the thermal fluid. Irrespective of the specific temperature sensitive element 26 employed, the temperature sensitive element 26 is disposed within the second cavity 16 and is in communication with a valve stem 30 that extends between the temperature sensitive element 26 and a flow manipulating device, such as a valve disc 32. The valve disc 32 is disposed in the second cavity and is situated in close proximity with a cooling flow passage 34 that enlarges or restricts a volumetric flow rate of the cooling flow 18 from the second cavity 16 to the first cavity 14 along a cooling path 36 that extends through the cavity wall 12.

The cooling flow 18 is provided directly or indirectly from a compressor (not illustrated) or from any other source, either internal or external to the gas turbine. The cooling flow 18 is routed through the cooling path 36 and naturally tends to the second cavity 16 based on the pressure differential between the first cavity 14 and the second cavity 16. To prevent unnecessary excess flow being routed through the cooling path 36, the valve disc 32 is closed when the temperature sensitive element is set in a first temperature operating condition (FIG. 1) that efficiently results in reducing or preventing chargeable cooling flow 18 losses. In this condition, the cooling flow 18 flows at a first volumetric flow rate, which may be zero when the valve disc 32 is completely closed. The first temperature operating condition occurs when the temperature sensitive element 26 senses a temperature below an assembly actuation temperature.

Figure 2:
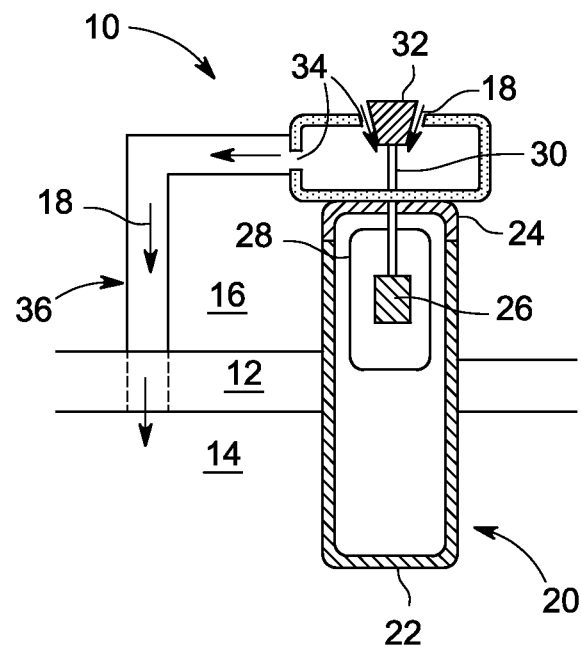
FIG. 2 is an elevational, side view of the thermally actuated assembly of FIG. 1 in a second temperature operating condition.

Referring to FIG. 2, the valve disc 32 displaces to a second temperature operating condition and results in a second volumetric flow rate of the cooling flow 18 in response to a rise in the first temperature of the first cavity 14. The second temperature operating condition occurs when the temperature sensitive element 26 senses a temperature above the assembly actuation temperature. As the first temperature decreases, the valve disc 32 displaces to decrease the volumetric flow rate of the cooling flow 18. Displacement of the valve disc 32 is actuated by the temperature sensitive element 26 upon remotely detecting a temperature change in the first cavity 14 via the heat transfer component 20. As illustrated in FIGS. 1 and 2, a temperature rise in the first cavity 14 is remotely communicated to the temperature sensitive element 26 and results in an expansion of the temperature sensitive element 26, thereby forcing the valve stem 30 to axially displace the valve disc 32. Axial displacement of the valve disc 32 in response to a temperature rise in the first cavity 14 allows more of the cooling flow 18 to enter the cooling flow passage 34 and travel through the cooling airflow path 36 to the first cavity 14.

Disposal of the temperature sensitive element 26, the valve stem 30 and the valve disc 32 in the second cavity 16 (i.e., cooler cavity) allows operation of the components in a relatively cooler environment than that of the first cavity 14 (i.e., hot cavity), thereby allowing passive, remote detection of temperature changes in the first cavity 14. The remote detection configuration is particularly useful for embodiments of the temperature sensitive element 26 comprising materials or substances that may not function adequately if subjected to the first temperature of the first cavity 14, which may exceed 1,000° F. (538° C.). Disposal of the temperature sensitive element 26 in the second cavity 16 reduces the thermal stress that the temperature sensitive element 26 is subjected to. The heat transfer component 20 serves as an intermediary to reduce the temperature condition that the temperature sensitive element 26 must function in. Furthermore, the valve stem 30 and the valve disc 32 are subjected to an even lower operating temperature than the temperature sensitive element 26, with only the heat transfer component 20 and the temperature sensitive element 26 subjected to increased temperature.

Figure 4:
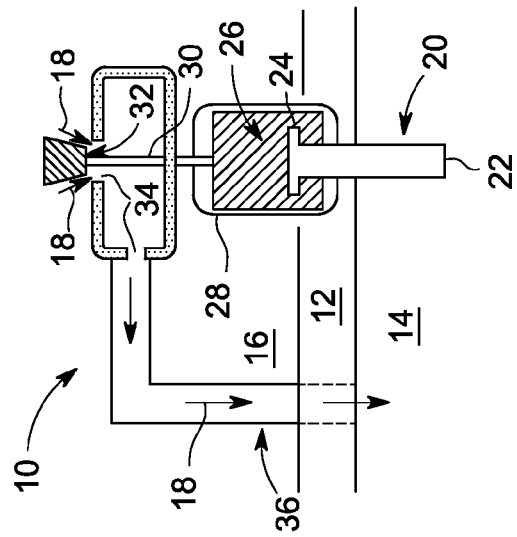
FIG. 4 is an elevational, side view of the thermally actuated assembly of FIG. 3 in the second temperature operating condition.
Figure 3:
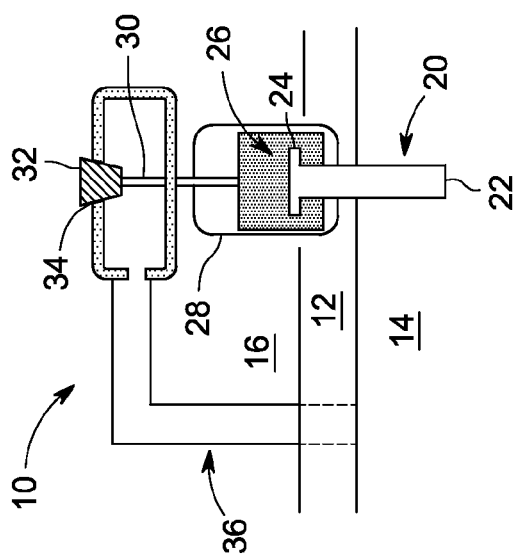
FIG. 3 is an elevational, side view of the thermally actuated assembly of a second embodiment mounted to the cavity wall, the thermally actuated assembly in the first temperature operating condition.

Referring now to FIGS. 3 and 4, a second exemplary embodiment of the thermally actuated assembly 10 is illustrated. The second exemplary embodiment is similar in construction and functionality to that of the first exemplary embodiment described in detail above. In the illustrated embodiment, the heat transfer component 20 is a thermal rod that extends into the actuator housing 28 and is in direct or indirect contact with the temperature sensitive element 26.

Figure 5:
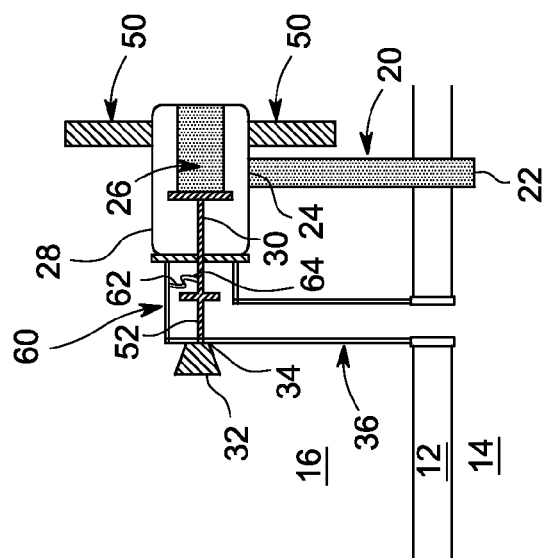
FIG. 5 is an elevational side view of the thermally actuated assembly of a third embodiment mounted to a remote location.

Referring now to FIG. 5, a third exemplary embodiment of the thermally actuated assembly 10 is illustrated. In contrast to the first embodiment (FIGS. 1 and 2) and the second embodiment (FIGS. 3 and 4), each described above, and which are each mounted directly to the cavity wall 12, the third embodiment is mounted at a remote location 50, such as a gas turbine stator assembly, for example. Additionally, as is the case with all embodiments of the thermally actuated assembly 10, a spring 52 may be included proximate the valve disc 32 to further control displacement force characteristics of the valve disc 32.

A ratchet assembly 60 may also be included in any of the previously described embodiments (illustrated only in FIG. 5) to allow the valve disc 32 to retract and thereby decrease the volumetric flow rate of the cooling flow 18, but prohibits extension, which would enlarge the cooling flow passage 34 and increase the volumetric flow rate of the cooling flow 18. The ratchet assembly 60 comprises at least one, but possibly a plurality of, first engagement member 62 that is configured to engage at least one, but possibly a plurality of, second engagement member 64. The ratchet assembly 60 is particularly useful for an inter-stage seal bypass function, which requires less cooling flow 18 into the first cavity 14 as a seal, such as a brush seal, wears and allows increased cooling flow to the first cavity 14 via a secondary passage that is sealed by the seal.

Figure 6:
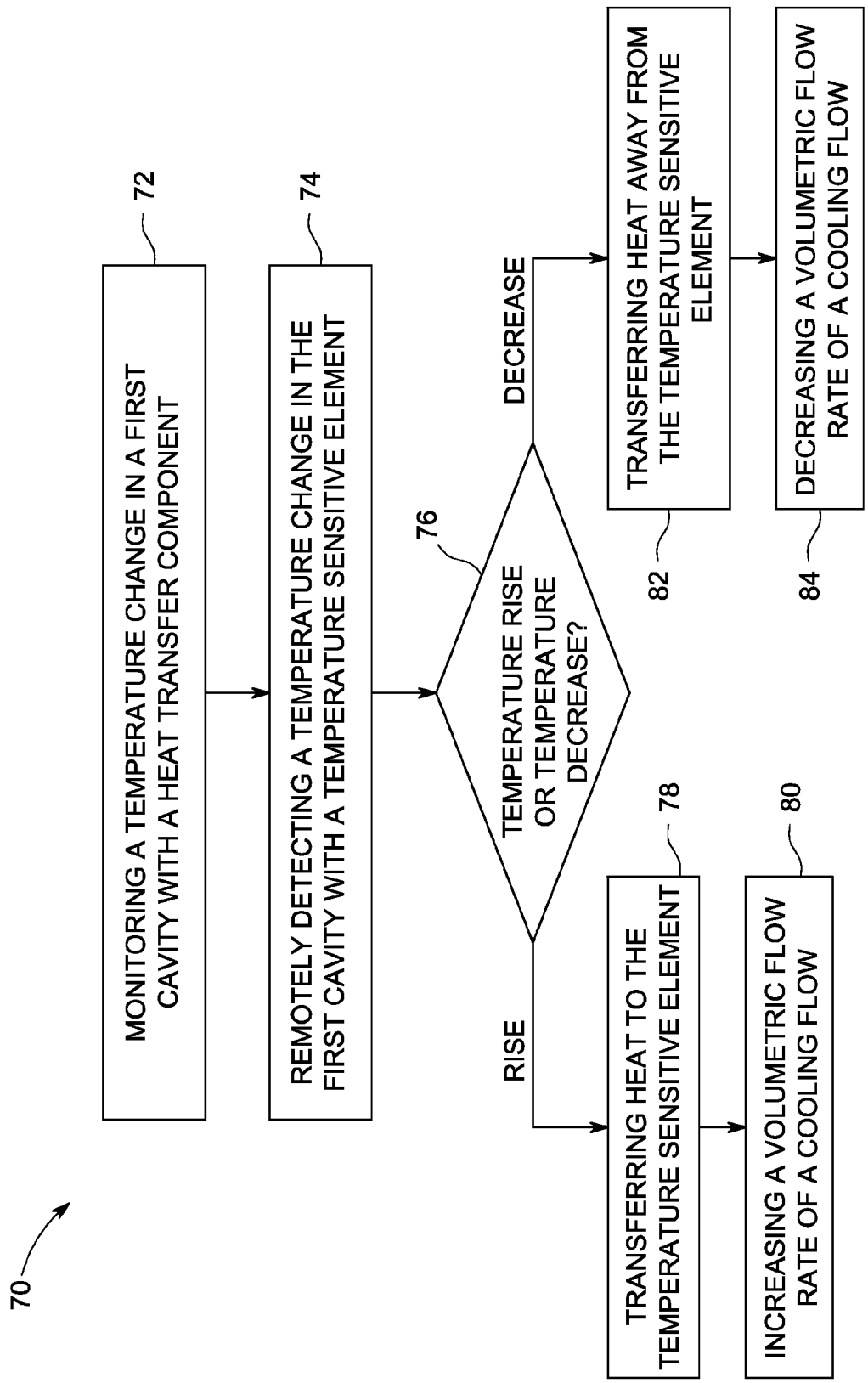
FIG. 6 is a flow diagram illustrating a method of controlling a cooling airflow path of the gas turbine system.

Referring now to FIG. 6, a method of controlling a cooling airflow path 70 with the thermally actuated assembly 10 is also provided. The thermally actuated assembly 10 has been previously described and specific structural components need not be described in further detail. The method of controlling a cooling airflow path 70 includes monitoring a temperature change in the first cavity 72 with the heat transfer component 20. The temperature change in the first cavity 14 is remotely detected 74 by the temperature sensitive element 26 that is disposed in the second cavity 16, where the remote detection is achieved by an operable connection between the temperature sensitive element 26 and the heat transfer component 20. Upon remote detection of the temperature change in the first cavity 14, the temperature sensitive element 26 actuates the flow manipulating device, such as the valve disc 32, where the actuation depends on whether the temperature change is a temperature rise or a temperature decrease 76. If the temperature change remotely detected is a temperature rise in the first cavity 14, where heat is transferred to 78 the temperature sensitive element 26, the cooling flow passage 34 is enlarged to increase the volumetric flow rate 80 of the cooling flow 18. Conversely, if the temperature change remotely detected is a temperature decrease in the first cavity 14, where heat is transferred away 82 from the temperature sensitive element 26, the cooling flow passage 34 is restricted to decrease the volumetric flow rate 84 of the cooling flow 18.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A thermally actuated assembly for a gas turbine system comprising:
   a heat transfer component comprising a heat pipe and having a first portion and a second portion, wherein the first portion is disposed within a first cavity having a first temperature and the second portion is disposed in a second cavity having a second temperature, wherein the heat transfer component extends through a cavity wall, wherein the first temperature is greater than the second temperature;
   a temperature sensitive element disposed within the second cavity and in operable communication with the heat transfer component, the heat pipe surroundingly enclosing the temperature sensitive element; and
   a flow manipulating device disposed within the second cavity and configured to displace in response to a temperature change in the first cavity.

2. The thermally actuated assembly of claim 1, the first cavity having a first pressure and the second cavity having a second pressure, wherein the second pressure is greater than the first pressure.

3. The thermally actuated assembly of claim 2, wherein the flow manipulating device comprises a valve disc and a valve stem extending from the valve disc to the temperature sensitive element.

4. The thermally actuated assembly of claim 1, wherein the temperature sensitive element comprises a thermal fluid.

5. The thermally actuated assembly of claim 4, further comprising an actuator housing containing the thermal fluid, wherein the heat transfer component transfers heat to the thermal fluid in response to a temperature rise in the first cavity, thereby actuating the flow manipulating device to increase a volumetric flow rate of a cooling airflow from the second cavity to the first cavity.

6. The thermally actuated assembly of claim 5, wherein the heat transfer component transfers heat away from the thermal fluid in response to a temperature decrease in the first cavity, thereby actuating the flow manipulating device to decrease the volumetric flow rate of the cooling airflow from the second cavity to the first cavity.

7. The thermally actuated assembly of claim 3, further comprising a ratchet assembly comprising a first engagement member configured to engage a second engagement member, wherein the ratchet assembly is disposed proximate the valve stem.

8. The thermally actuated assembly of claim 1, further comprising a plurality of thermally actuated assemblies, wherein each of the plurality of assemblies comprises a distinct actuation temperature and is configured to provide a distinct volumetric flow rate of cooling flow.

9. A thermally actuated assembly for a gas turbine system comprising:
   a first cavity having a first temperature;
   a second cavity having a second temperature, wherein the first temperature is greater than the second temperature, wherein the first cavity and the second cavity are separated by a cavity wall;
   a heat transfer component comprising a heat pipe and extending through the cavity wall, the heat transfer component having a first end disposed in the first cavity and a second end disposed in the second cavity;
   a temperature sensitive element disposed within the second cavity and configured to remotely detect changes in the first temperature by operably communicating with the heat transfer component, the heat pipe surroundingly enclosing the temperature sensitive element; and
   a flow manipulating device disposed within the second cavity and configured to enlarge and restrict a cooling flow passage, wherein the flow manipulating device is actuated in response to detection of a temperature change in the first cavity by the temperature sensitive element.

10. The thermally actuated assembly of claim 9, wherein the temperature sensitive element comprises a thermal fluid.

11. The thermally actuated assembly of claim 10, further comprising an actuator housing containing the thermal fluid, wherein the heat transfer component transfers heat to the thermal fluid in response to a temperature rise in the first cavity, thereby actuating the flow manipulating device to enlarge the cooling flow passage to increase a volumetric flow rate of a cooling airflow from the second cavity to the first cavity.

12. The thermally actuated assembly of claim 11, wherein the heat transfer component transfers heat away from the thermal fluid in response to a temperature decrease in the first cavity, thereby actuating the flow manipulating device to restrict the cooling flow passage to decrease the volumetric flow rate of the cooling airflow from the second cavity to the first cavity.

13. The thermally actuated assembly of claim 9, further comprising a ratchet assembly comprising a first engagement member configured to engage a second engagement member, wherein the ratchet assembly is disposed proximate a valve stem of the flow manipulating device.

* * * * *